(12) United States Patent
Langer et al.

(10) Patent No.: US 12,399,544 B2
(45) Date of Patent: Aug. 26, 2025

(54) POE PSE MPS SUPPORT FOR PSE VOLTAGE TRANSIENTS

(71) Applicant: Microchip Technology Incorporated, Chandler, AZ (US)

(72) Inventors: Tamir Langer, Tel Aviv (IL); Arkadiy Peker, Glen Cove, NY (US)

(73) Assignee: Microchip Technology Incorporated, Chandler, AZ (US)

( * ) Notice: Subject to any disclaimer, the term of this patent is extended or adjusted under 35 U.S.C. 154(b) by 52 days.

(21) Appl. No.: 18/227,336

(22) Filed: Jul. 28, 2023

(65) Prior Publication Data

US 2024/0036625 A1 Feb. 1, 2024

Related U.S. Application Data

(60) Provisional application No. 63/392,950, filed on Jul. 28, 2022.

(51) Int. Cl.
  *G06F 1/26* (2006.01)
  *G06F 1/3209* (2019.01)
  *G06F 1/3215* (2019.01)

(52) U.S. Cl.
  CPC .............. *G06F 1/26* (2013.01); *G06F 1/266* (2013.01); *G06F 1/3209* (2013.01); *G06F 1/3215* (2013.01)

(58) Field of Classification Search
  CPC .......... G06F 1/26; G06F 1/266; G06F 1/3209; G06F 1/3215
  USPC ............................ 713/300, 340; 710/15, 105
  See application file for complete search history.

(56) References Cited

U.S. PATENT DOCUMENTS

| | | | |
|---|---|---|---|
| 2006/0181817 A1* | 8/2006 | Ohana | G06F 1/26 361/18 |
| 2008/0040625 A1* | 2/2008 | Vorenkamp | H04L 25/02 713/340 |
| 2015/0137618 A1* | 5/2015 | Vaajala | H02H 3/0935 307/116 |
| 2015/0372826 A1* | 12/2015 | Blaut | H04L 12/10 307/1 |
| 2016/0095175 A1 | 3/2016 | Picard et al. | 315/294 |
| 2017/0012787 A1 | 1/2017 | Horváth et al. | 307/1 |
| 2018/0176026 A1 | 6/2018 | Yseboodt et al. | |
| 2018/0227132 A1* | 8/2018 | Picard | H05B 47/187 |

(Continued)

OTHER PUBLICATIONS

International Search Report and Written Opinion, Application No. PCT/US2023/028931, 13 pages, Nov. 3, 2023.

*Primary Examiner* — Ji H Bae
(74) *Attorney, Agent, or Firm* — SLAYDEN GRUBERT BEARD PLLC

(57) ABSTRACT

An apparatus includes a power-over-Ethernet (POE) interface to be connected to a powered device (PD) over an Ethernet cable and a control circuit. The control circuit is to measure a voltage provided by the apparatus through the Ethernet cable, determine that the voltage has dropped by at least a given voltage change, based on a determination that the voltage has dropped by at least the given voltage change, determine whether or not a predetermined quantity of Maintain Power Signature (MPS) signals have been missed within a given time frame, and, based on a determination that the predetermined quantity of MPS signals has not been missed within the given time frame, determine that the PD is still connected to the apparatus.

17 Claims, 11 Drawing Sheets

(56) References Cited

U.S. PATENT DOCUMENTS

2021/0194708 A1* 6/2021 Wendt ....................... G05F 1/70
2023/0004202 A1* 1/2023 Yi ........................... G06F 1/266

* cited by examiner

| ## | VPSE VOLTAGE (V) | VPSE VOLTAGE DROP (DV) | MPS PULSE 1 (MS) | MPS PULSE 2 (MS) | MPS PULSE 3 (MS) | MPS PULSE 4 (MS) | MPS PULSE 5 (MS) | MPS PULSE 6 (MS) | MPS PULSE 1 MISSED | MPS PULSE 2 MISSED | MPS PULSE 3 MISSED | MPS PULSE 4 MISSED | MPS PULSE 5 MISSED | MPS PULSE 6 MISSED | DV | TOTAL NUMBER OF PULSES MISSED |
|---|---|---|---|---|---|---|---|---|---|---|---|---|---|---|---|---|
| 1 | 56 | 0 | 18.7 | 18.7 | 18.7 | 18.7 | 18.7 | 18.7 | 0 | 0 | 0 | 0 | 0 | 0 | 0 | 0 |
| 2 | 55.8 | -0.2 | 12.32 | 18.68 | 18.69 | 18.7 | 18.7 | 18.7 | 0 | 0 | 0 | 0 | 0 | 0 | -0.2 | 0 |
| 3 | 55.6 | -0.4 | 6.75 | 18.66 | 18.65 | 18.7 | 18.7 | 18.7 | 1 | 0 | 0 | 0 | 0 | 0 | -0.4 | 1 |
| 4 | 55.4 | -0.6 | 0.95 | 18.62 | 18.65 | 18.7 | 18.7 | 18.7 | 1 | 0 | 0 | 0 | 0 | 0 | -0.6 | 1 |
| 5 | 55.2 | -0.8 | 0 | 18.62 | 18.65 | 18.64 | 18.64 | 18.64 | 1 | 0 | 0 | 0 | 0 | 0 | -0.8 | 1 |
| 6 | 55 | -1 | 0 | 18.62 | 18.63 | 18.64 | 18.64 | 18.64 | 1 | 0 | 0 | 0 | 0 | 0 | -1 | 1 |
| 7 | 54.8 | -1.2 | 0 | 18.58 | 18.6 | 18.61 | 18.61 | 18.61 | 1 | 0 | 0 | 0 | 0 | 0 | -1.2 | 1 |
| 8 | 54.6 | -1.4 | 0 | 18.53 | 18.6 | 18.6 | 18.6 | 18.6 | 1 | 0 | 0 | 0 | 0 | 0 | -1.4 | 1 |
| 9 | 54.4 | -1.6 | 0 | 18.37 | 18.6 | 18.58 | 18.58 | 18.58 | 1 | 0 | 0 | 0 | 0 | 0 | -1.6 | 1 |
| 10 | 54.2 | -1.8 | 0 | 17.65 | 18.6 | 18.56 | 18.56 | 18.56 | 1 | 0 | 0 | 0 | 0 | 0 | -1.8 | 1 |
| 11 | 54 | -2 | 0 | 15.09 | 18.54 | 18.55 | 18.55 | 18.55 | 1 | 0 | 0 | 0 | 0 | 0 | -2 | 1 |
| 12 | 53.8 | -2.2 | 0 | 10.62 | 18.54 | 18.53 | 18.53 | 18.53 | 1 | 0 | 0 | 0 | 0 | 0 | -2.2 | 1 |
| 13 | 53.6 | -2.4 | 0 | 5.32 | 18.54 | 18.52 | 18.52 | 18.52 | 1 | 1 | 0 | 0 | 0 | 0 | -2.4 | 2 |
| 14 | 53.4 | -2.6 | 0 | 0 | 18.49 | 18.5 | 18.5 | 18.5 | 1 | 1 | 0 | 0 | 0 | 0 | -2.6 | 2 |
| 15 | 53.2 | -2.8 | 0 | 0 | 18.45 | 18.49 | 18.49 | 18.49 | 1 | 1 | 0 | 0 | 0 | 0 | -2.8 | 2 |
| 16 | 53 | -3 | 0 | 0 | 18.4 | 18.47 | 18.47 | 18.47 | 1 | 1 | 0 | 0 | 0 | 0 | -3 | 2 |
| 17 | 52.8 | -3.2 | 0 | 0 | 18.35 | 18.46 | 18.46 | 18.46 | 1 | 1 | 0 | 0 | 0 | 0 | -3.2 | 2 |
| 18 | 52.6 | -3.4 | 0 | 0 | 18.35 | 18.4 | 18.4 | 18.4 | 1 | 1 | 0 | 0 | 0 | 0 | -3.4 | 2 |
| 19 | 52.4 | -3.6 | 0 | 0 | 18.11 | 18.42 | 18.42 | 18.42 | 1 | 1 | 0 | 0 | 0 | 0 | -3.6 | 2 |
| 20 | 52.2 | -3.8 | 0 | 0 | 16.99 | 18.4 | 18.4 | 18.4 | 1 | 1 | 0 | 0 | 0 | 0 | -3.8 | 2 |
| 21 | 52 | -4 | 0 | 0 | 13.75 | 18.39 | 18.39 | 18.39 | 1 | 1 | 0 | 0 | 0 | 0 | -4 | 2 |
| 22 | 51.8 | -4.2 | 0 | 0 | 8.95 | 18.39 | 18.39 | 18.39 | 1 | 1 | 0 | 0 | 0 | 0 | -4.2 | 2 |

FIG. 6

| | | | | | | | | | | | | | | | |
|---|---|---|---|---|---|---|---|---|---|---|---|---|---|---|---|
| 23 | 51.6 | -4.4 | 0 | 0 | 3.47 | 18.35 | 18.35 | 18.35 | 1 | 1 | 1 | 1 | 0 | 0 | 0 | -4.4 | 3 |
| 24 | 51.4 | -4.6 | 0 | 0 | 0 | 18.33 | 18.33 | 18.33 | 1 | 1 | 1 | 1 | 0 | 0 | 0 | -4.6 | 3 |
| 25 | 51.2 | -4.8 | 0 | 0 | 0 | 18.31 | 18.31 | 18.31 | 1 | 1 | 1 | 1 | 0 | 0 | 0 | -4.8 | 3 |
| 26 | 51 | -5 | 0 | 0 | 0 | 18.27 | 18.29 | 18.29 | 1 | 1 | 1 | 1 | 0 | 0 | 0 | -5 | 3 |

FIG. 6 (Continued)

POE PSE MPS SUPPORT FOR PSE VOLTAGE TRANSIENTS

PRIORITY

This application claims priority to U.S. Provisional Patent Application No. 63/392,950 filed Jul. 28, 2022, the contents of which are hereby incorporated in their entirety.

FIELD OF THE INVENTION

The present disclosure relates to power over Ethernet (POE) and, more particularly, to POE power sourcing equipment (PSE) Maintain Power Signature (MPS) support for PSE voltage transients.

BACKGROUND

POE may include passing electric power along with data on twisted-pair Ethernet cabling. This may allow a cable to provide both data connection and electric power from a source (referred to as PSE) to devices (referred to as powered devices (PD)). PD devices may include, for example, wireless access points (WAPs), Internet Protocol (IP) cameras, and voice over Internet Protocol (VoIP) phones.

When a PSE is supplying power to a PD, the PSE may monitor the current drawn by the PD in order to make sure that the PD is still connected. The minimum current that the PD has to draw to avoid being considered to be disconnected from the PSE is called a maintain power signature (MPS) signal. A spike in current or an instance in current drawn by the PD and as observed by the PSE may be considered an MPS signal. This behavior may be defined by, for example, the IEEE 802.3 bt standard, which further specifies amplitude and duration of MPS current that is drawn by PDs and observed by PSEs. For example, the PSE may remove power from the POE cable connecting the PSE to the PD when the PSE has not seen an MPS signal for at least 400 milliseconds, so that cables disconnected from the PD do not remain powered.

The MPS signal may be defined as a current pulse received at the PSE from the PD that draws a certain amount of current for a minimum amount of time, with a certain duty-cycle. The amplitude, minimum pulse-width, and duty cycle may be defined in various different POE standards or protocols, and may be a function of the assigned class, a capability of the PSE to support short (low duty-cycle) or long (higher duty-cycle) MPS, and system characteristics (as cable resistance, DC/DC input capacitance, etc.).

Inventors of examples of the present disclosure have discovered that a PD might not issue MPS pulses in order to remain powered. Such devices might operate with relatively low power consumption compared to other PDs. Such devices may internally draw or absorb MPS pulses to remain powered. PD devices may have a current sink or resistor that the PD can control so as to appear to remain connected to the PSE. When such a circuit of the PD is activated but with low load, the resulting current may be initially sourced mostly from a bulk capacitor of the PD. Inventors of examples of the present disclosure have discovered that if voltage provided by the PSE to the PD, known as PSE voltage, rapidly decreases during MPS PSE-even though the PD, a diode bridge will be reverse biased and all current will be taken from the PD capacitor, and this may continue until PSE and PD voltage become approximately equal. This can happen during PSE power supply voltage transients, and in this case the PSE may determine that there is no MPS current and the PSE may shut down the PD, even though PD is supplying MPS current.

Examples of the present disclosure may address one or more of these issues. Examples of the present disclosure may address false POE PSE port shutdowns in case of PSE voltage transients when PSE operate in MPS mode.

BRIEF DESCRIPTION OF THE DRAWINGS

FIG. 6 is an illustration of example values from an experiment for a given cable, PD, and apparatus 100, according to examples of the present disclosure.

DETAILED DESCRIPTION

Figure 1:
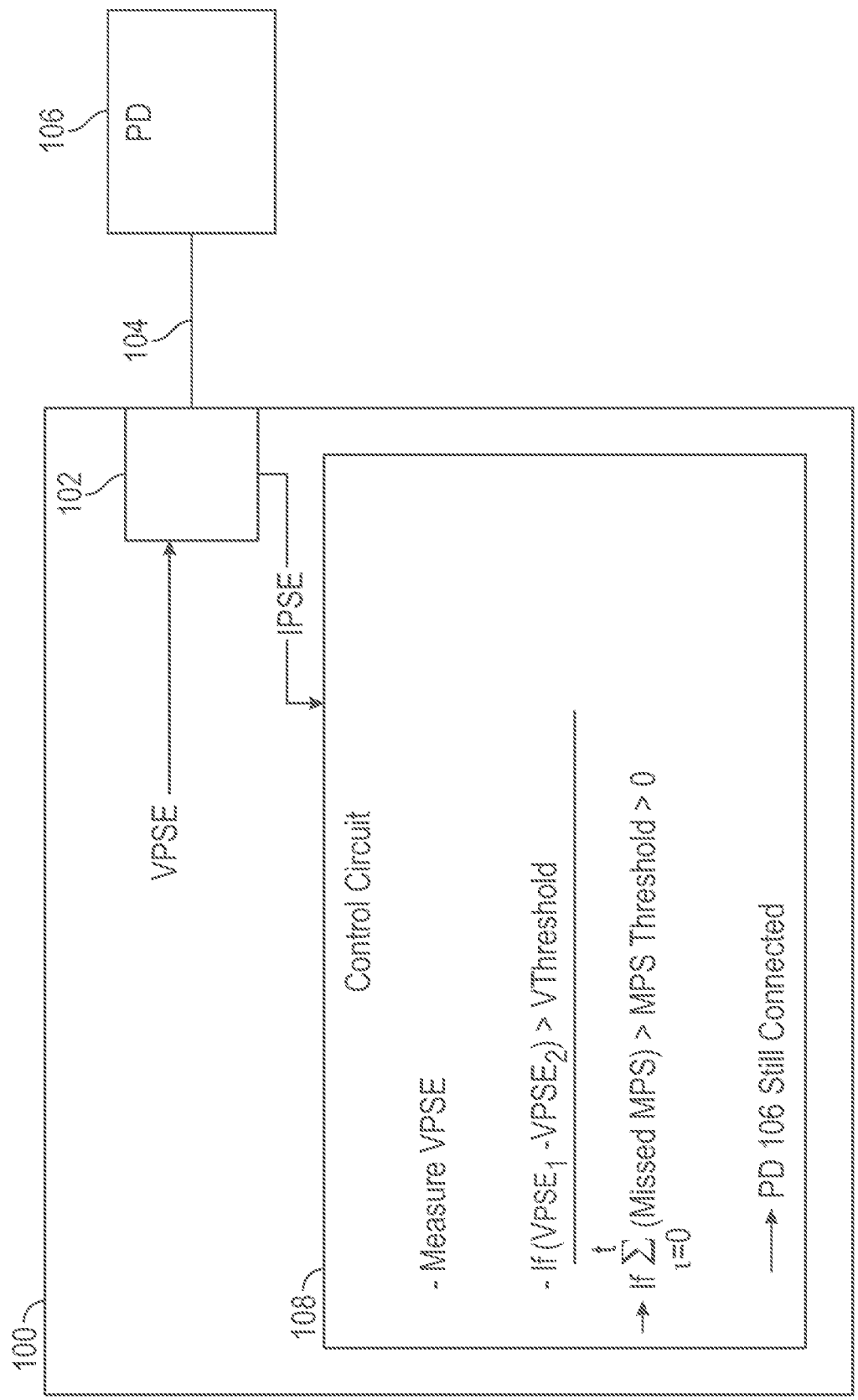
FIG. 1 illustrates an apparatus for POE, according to examples of the present disclosure.

FIG. 1 illustrates an apparatus 100 for POE, according to examples of the present disclosure.

Apparatus 100 may include interface 102 configured to provide communication from apparatus 100 to any suitable electronic device, such as PD 106. Interface 102 may be implemented in any suitable manner, such as by analog circuitry, digital circuitry, control logic, instructions in a memory for execution by a processor, digital logic circuits programmed through hardware description language, application specific integrated circuits (ASIC), field programmable gate arrays (FPGA), programmable logic devices (PLD), or any suitable combination thereof, whether in a unitary device or spread over several devices. Interface 102 may be configured to provide communication in any suitable format, such as Ethernet. PD 106 may be implemented as any suitable electronic device that receives its power at least in part through POE from apparatus 100. Apparatus 100 may be connected to PD 106 over any suitable connection, such as an Ethernet cable 104.

Apparatus 100 may include a control circuit 108. Control circuit 108 may be implemented in any suitable manner, such as by analog circuitry, digital circuitry, control logic, instructions in a memory for execution by a processor, digital logic circuits programmed through hardware description language, ASIC, FPGA, PLD, or any suitable combination thereof, whether in a unitary device or spread over several devices.

Control circuit 108 may be configured to measure a voltage provided by apparatus 100 to PD 106 and returned from PD 106. The voltage provided by apparatus 100 to PD 106 may be given as VPSE. A current may also be provided by apparatus 100 to PD 106, and may be given as IPSE. A current may be returned from PD 106 and may be given as IPSE. The voltage provided by apparatus 100 may be provided through interface 102 and Ethernet cable 104 to PD 106. Similarly, the current returned from PD 106 to apparatus 100 may be provided through Ethernet cable 104.

Control circuit 108 may be configured to measure VPSE and IPSE through any suitable mechanism. Analog to digital converters (ADCs) may sample VPSE. IPSE may be measured by a current sense resistor within apparatus 100.

Control circuit 108 may be configured to measure VPSE and determine whether VPSE has dropped by at least a given voltage change, given by VTHRESHOLD. The voltage change may be given by $VPSE_1$-$VPSE_2$. The measurement may be made periodically or on-demand, such as every millisecond, though some sampling may occur faster or may occur every 1-5 milliseconds. The voltage change may be a voltage drop. The first and second measurements of VPSE may be made at any suitable moments in time. The first and second measurements of VPSE may be consecutive or may be nonconsecutive. Control circuit 108 may be configured to, based upon a determination that the given voltage change has exceeded the threshold, determine whether or not a predetermined quantity of MPS signals have been missed within a given time frame. The predetermined quantity may be given as MPS-THRESHOLD. The predetermined quantity of MPS signals may be greater than zero. Control circuit 108 may be configured to, based on a determination that the predetermined quantity of MPS signals has not been missed within the given time frame, determine that PD 106 is still connected to apparatus 100.

The given time frame may be of any suitable length. The voltage drop threshold may be of any suitable value. The predetermined quantity of MPS signals that have been missed within the given time frame may be of any suitable value. Moreover, the predetermined quantity of MPS signals may be based upon the value of the voltage drop, and may vary according to the value of the voltage drop.

Any suitable manner or mechanism may be used to determine a quantity of missed MPS signals. For example, a counter (not shown) may be used, and at each point in time when an MPS signal was expected but was not received, the counter may be incremented by control circuit 108. If the predetermined quantity is reached, then control circuit 108 may make the appropriate determination. In another example, the time to wait before determining whether or not the predetermined quantity of MPS signals has been missed may be equal to the predetermined quantity times the total cycle time of a given MPS signal. In such an example, control circuit 108 may wait for such a time to wait to determine whether an MPS signal has yet been received, without explicitly counting the missed MPS signals, as such a time to wait may implicitly reflect such a number of missed MPS signals.

Thus, control circuit 108 may cause apparatus 100 to continue to power PD 106 even if an MPS signal is missed, at least for a given count of missed MPS signals greater than zero. Moreover, control circuit 108 may measure VPSE and determine a voltage drop and, based on the value of the voltage drop, determine a quantity of MPS signals that are allowed to be missed at apparatus 100 before powering down PD 106. Thus, apparatus 100 might not falsely turn off PD 106 in case of a voltage drop.

Figure 2:
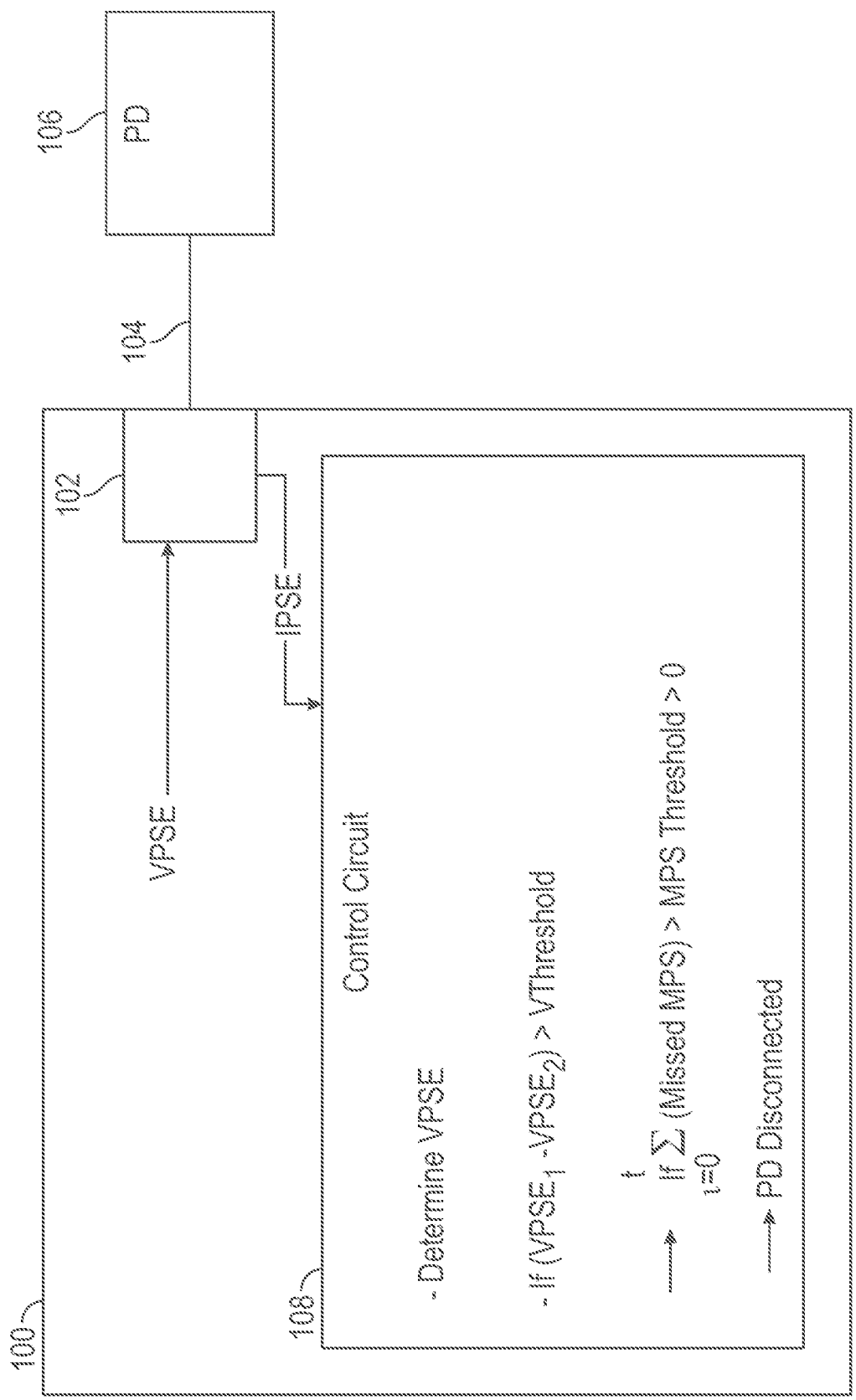
FIG. 2 is another illustration an of apparatus for POE, according to examples of the present disclosure.

FIG. 2 is another illustration of apparatus 100 for POE, according to examples of the present disclosure.

Control circuit 108 may be configured to determine VPSE and VPSE. Control circuit 108 may be configured to determine whether VPSE has dropped by at least a given voltage change, given by VTHRESHOLD. The voltage drop may be given by $VPSE_1$-$VPSE_2$. Control circuit 108 may be configured to, based upon a determination that the given voltage change has exceeded the threshold, determine whether or not a predetermined quantity of MPS signals have been missed within a given time frame. The predetermined quantity may be given as MPS-THRESHOLD. The predetermined quantity of MPS signals may be greater than zero. Control circuit 108 may be configured to, based on a determination that the predetermined quantity of MPS signals has been missed within the given time frame, determine that PD 106 is disconnected from apparatus 100.

The given time frame may be of any suitable length. The voltage drop threshold may be of any suitable value. The predetermined quantity of MPS signals that have been missed within the given time frame may be of any suitable value. Moreover, the predetermined quantity of MPS signals may be based upon the value of the voltage drop, and may vary according to the value of the voltage drop.

Any suitable manner or mechanism may be used to determine a quantity of missed MPS signals. For example, a counter (not shown) may be used, and at each point in time when an MPS signal was expected but was not received, the counter may be incremented by control circuit 108. If the predetermined quantity is reached, then control circuit 108 may make the appropriate determination. In another example, the time to wait before determining whether or not the predetermined quantity of MPS signals has been missed may be equal to the predetermined quantity times the total cycle time of a given MPS signal. In such an example, control circuit 108 may wait for such a time to wait to determine whether an MPS signal has yet been received, without explicitly counting the missed MPS signals, as such a time to wait may implicitly reflect such a number of missed MPS signals.

Figure 3:
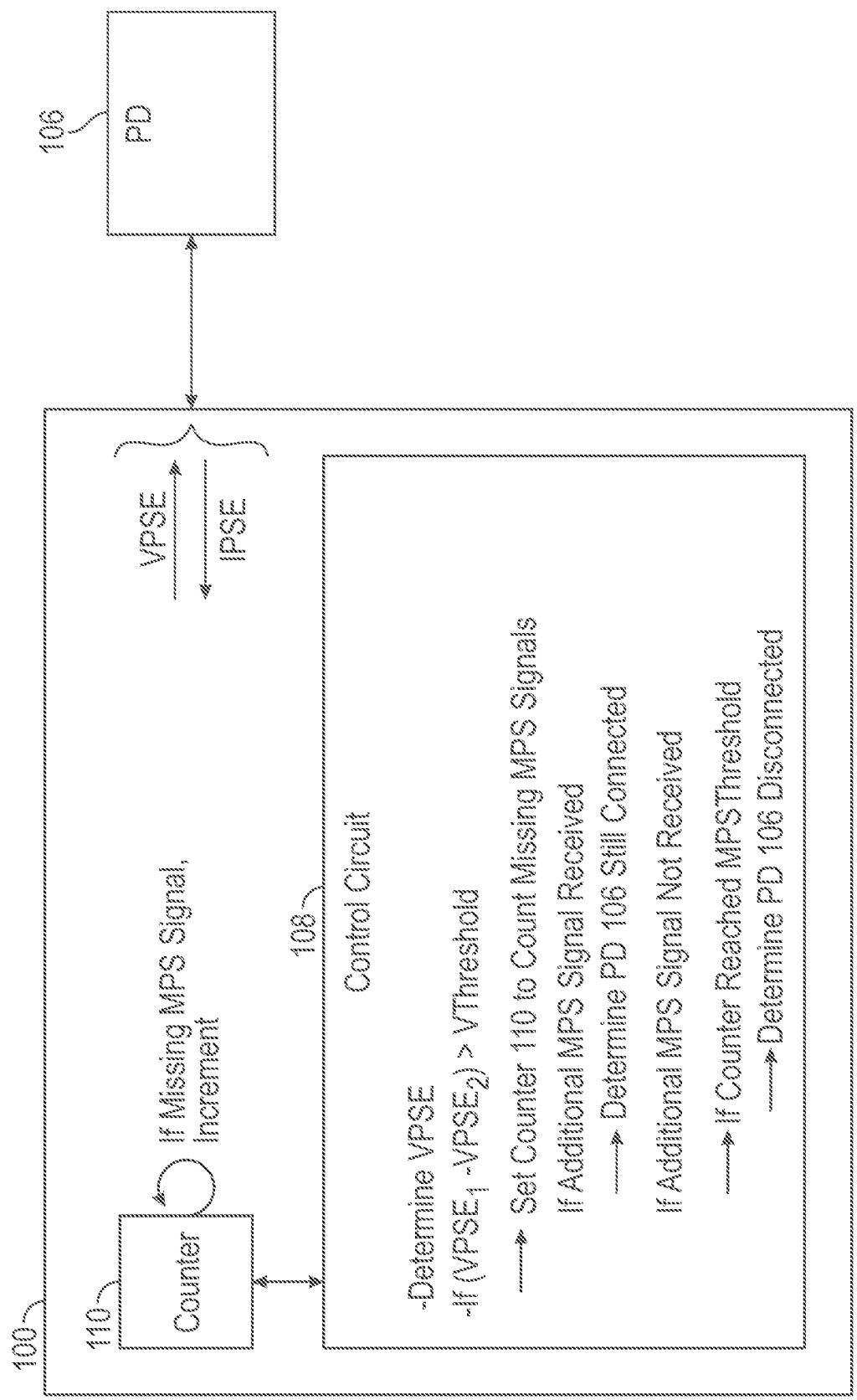
FIG. 3 is another illustration of an apparatus for POE, according to examples of the present disclosure.

FIG. 3 is another illustration of apparatus 100 for POE, according to examples of the present disclosure. Apparatus 100 is illustrated with a counter 110 configured to count missed MPS signals. Counter 110 may be implemented in any suitable manner, and may be implemented within or without control circuit 108.

Control circuit 108 may be configured to determine VPSE and VPSE. Control circuit 108 may be configured to measure $VPSE_1$ and $VPSE_2$ and determine whether VPSE has dropped by at least a given voltage change, given by VTHRESHOLD. The voltage change may be given by $VPSE_1$-$VPSE_2$. Control circuit 108 may be configured to, based upon a determination that the given voltage change has exceeded the threshold, set counter 110 to count missing MPS signals. An MPS signal may be determined to have been missed if a given time cycle for an expected MPS signal from PD 106 has expired without receiving an MPS signal. After setting counter 110 to count missing MPS signals, control circuit 108 may be configured to determine whether an additional MPS signal has been received. If such an additional MPS signal is received, control circuit 108 may be configured to determine that PD 106 is still connected to apparatus 100. If an additional MPS signal has not been received, control circuit 108 may be configured to determine whether counter 110 has reached the predetermined quantity of MPS signals that may be missed within a given time frame, given as MPSTHRESHOLD. If counter 110 has reached MPSTHRESHOLD, control circuit 108 may be configured to determine that PD 106 is disconnected from apparatus 100. MPSTHRESHOLD may be greater than zero.

Figure 4:
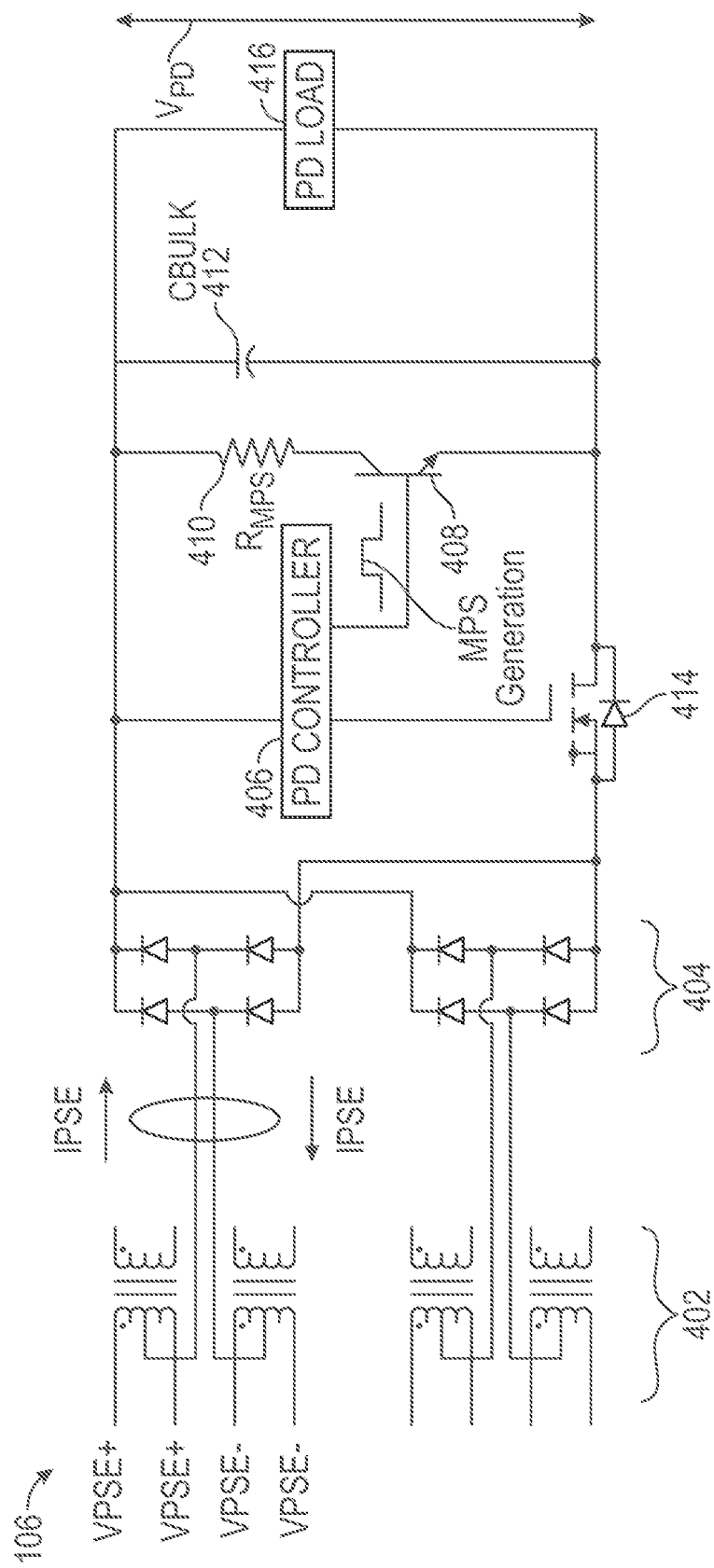
FIG. 4 is an illustration of a PD, according to examples of the present disclosure.

FIG. 4 is an illustration of PD 106, according to examples of the present disclosure.

PD 106 may include a front-end connector 402. Connector 402 may be configured to receive VPSE from apparatus 100 and provide IPSE to apparatus 100. Such portions may include transformer pairs to which the rest of PD 106 may be tapped. Connector 402 may include two ports. In the present disclosure, only the first port is discussed, for the purposes of simplicity.

PD 106 may include diode structures 404, implemented with any suitable number, kind, and arrangement of diodes. Diode structures 404 may act as diode bridges.

PD 106 may include a transistor 414. Transistor 414 may be implemented by any suitable transistor implementation. Transistor 414 may be configured to isolate PD 106 from PD load 106 during PD detection and classification.

PD 106 may include a PD controller 406. PD controller 406 may be implemented in any suitable manner, such as by analog circuitry, digital circuitry, control logic, instructions in a memory for execution by a processor, digital logic circuits programmed through hardware description language, ASIC, FPGA, PLD, or any suitable combination thereof, whether in a unitary device or spread over several devices. PD controller 406 may also include resistor 410, transistor 408, and transistor 414. PD controller 406 may be configured to cause an MPS signal to be generated periodically. The MPS signal may be provided to apparatus 100 (when connected) directly or indirectly. PD controller 106 may cause a transistor 408 (implemented in any suitable manner) to turn ON during the MPS signal on-time. This may cause a voltage supply, such as VPSE, to be provided through a resistor 410. This may cause current to flow out to apparatus 100 as IPSE, which may flow through resistor 410.

PD 106 may include a bulk capacitor 412 in parallel with a load of PD 106, given by PD load 416, and in parallel with diode structures 404.

In other implementations, a PD may need to be implemented with a limit or reduced size for a bulk capacitor where PSE voltage transients may occur. For example, a TEXAS INSTRUMENTS PD IC TPS2373 may specify a maximum capacitance of 300 uF for PSE voltage step-downs below 0.4 V, or a maximum capacitance of 120 uF for larger voltage step-downs such as 57V-50V. This is despite the fact that the POE specifications allow such capacitors to be up to 360 uF capacity. Thus, as a practical matter, in other implementations the size of a bulk capacitor is not as big as the size could be. By limiting capacitance values, the performance may be degraded and unwanted and unknown connection requirements may exist between a given PSE and PD. In contrast, examples of the present disclosure may remove dependencies between apparatus 100 (operated as a PSE) and PD 106 and allow PD 106 to use any values of capacitors, regardless of any PSE voltage transients.

For various implementations of PD 106, a minimum duty-cycle of MPS may be specified. Moreover, MPS pulse amplitude and width may be measured at apparatus 100 with assumptions of use of maximum cable length and worst-case capacitance. As a result, some required timings may reflect the time and amplitude at apparatus 100 of the IPSE to be observed.

During voltage transients that affect the available supply of voltage in PD 106, the diode bridges in diode portions 404 of PD 106 may become reverse-biased and IPSE might not be generated from VPSE within PD 106, but instead by bulk capacitor 412, which might otherwise cause apparatus 100 to believe that there is no IPSE and to turn off power to PD 106. PD 106 may include a current sink or resistor that it can control, in the form of resistor 410 and transistor 408. When such a current sink or resistor is activated during the voltage transient, the resulting current may be initially mostly sourced from bulk capacitor 412 rather than from VPSE from apparatus 100, because the diodes of diode portions 404 are reverse-biased. As the voltage of bulk capacitor 412 drops, more current may be drawn from apparatus 100 the PSE until finally the voltages from bulk capacitor 412 and VPSE have equalized and all current is drawn from apparatus 100. When VPSE rapidly decreases when an MPS signal is expected, apparatus 100 might not see the associated IPSE spike because a diode bridge such as those in diode structure 404 may be reverse biased and all current may be taken from bulk capacitor 412. Furthermore, this may continue until the voltages from bulk capacitor 412 and VPSE have equalized. This may describe a power supply voltage transient, and in this case the MPS signal would not be propagated to apparatus 100. In other implementations, the PSE would consider that there is no MPS current and the PSE would shut down the PD even though the PD is still connected and supplying MPS current. This may be a transient voltage spike or sink wherein the PD does not draw as much voltage from the PSE as the PD is actually using and may thus appear, from the perspective of the PD, to be disconnected from the PD. This may cause the PSE to falsely disconnect the PD from power. However, apparatus 100 may avoid this problem by first detecting a voltage drop on VPSE, and then allow a certain number of missed MPS signals before determining to disconnect PD 106 from power.

Figure 5:
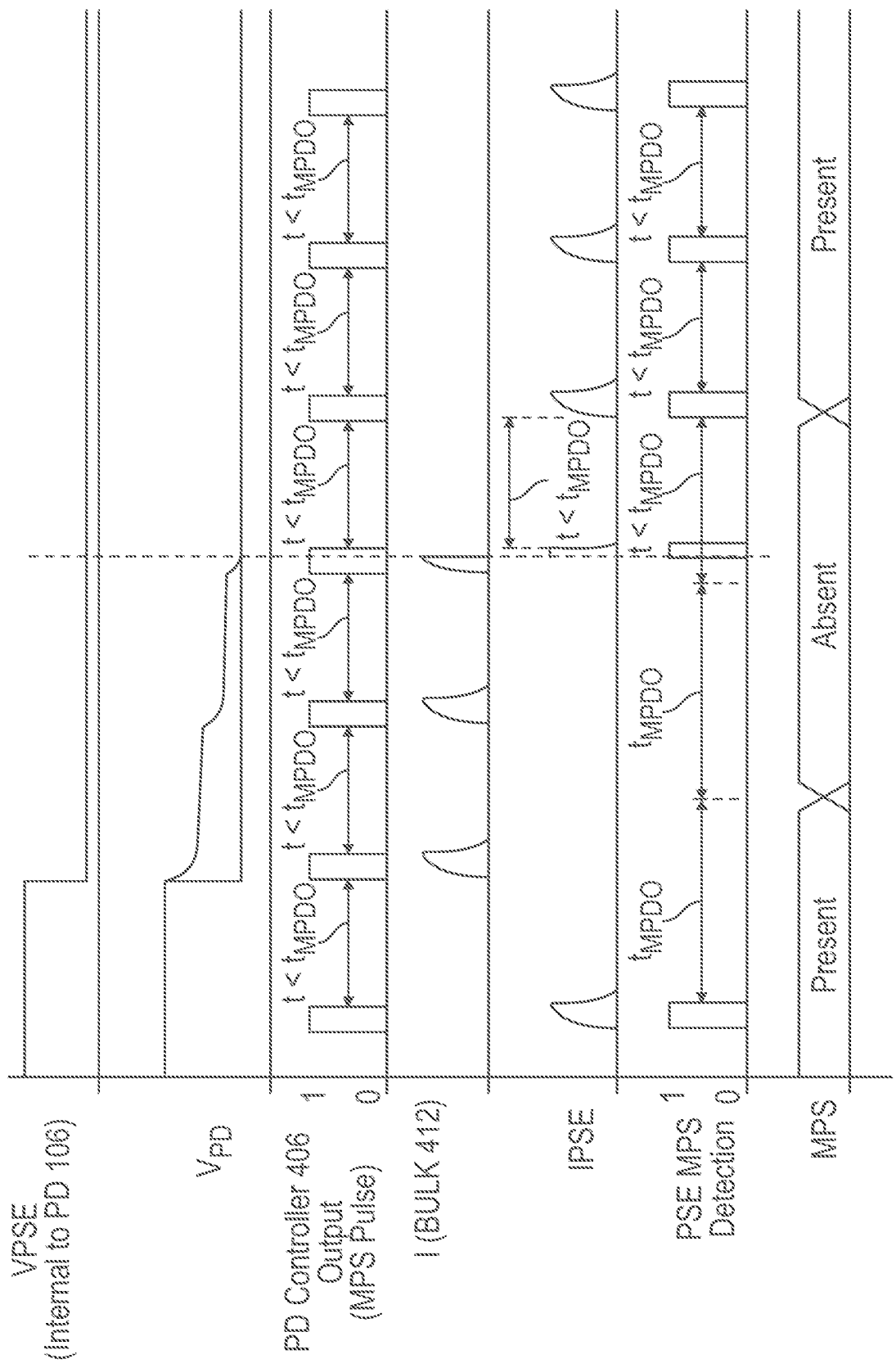
FIG. 5 is a timing diagram of operation of a PD, according to examples of the present disclosure.

FIG. 5 is a timing diagram of operation of a PD such as PD 106, according to examples of the present disclosure.

Illustrated are graphs of VPSE (as internal to PD 106), VPD (the voltage across PD 106), output of PD controller 406 or attempted MPS pulses, the current through bulk capacitor 412, the current IPSE out of PD 106 to apparatus 100, PSE MPS detection at apparatus 100, and an interpretation of whether MPS signals have been received within the designated time frame.

As shown, VPSE within PD 106 may drop due to a voltage transient condition, or due to a change of the total load on the power supply of the PSE, VPSE. As VPSE drops, bulk capacitor 412 may not allow VPD to abruptly discharge, resulting in VPD being higher than VPSE and forcing diodes of diode portion 404 to become reverse biased. PD controller 406 may issue MPS signals in the form of pulses. The time between such pulses may be less than a given constant. The constant may be given according to a particular standard followed by apparatus 100 or PD 106, and may be given as tMPDO. The current through bulk capacitor 412 may correspond to pulses generated by PD controller 406 output, but only while VPD is above VPSE less the forward voltage of diode portions 404. Such a forward voltage may be typically equal to two times the voltage drop (VD) of each diode comprising the diode bridges of diode portions 404 (at least for passive diodes). The current drawn by the MPS generated in PD 106 may discharge bulk capacitor 412, resulting in a decrease of VPD with every MPS pulse, corresponding to the MPS current amplitude and bulk capacitor 412 capacitance value. The current applied out to apparatus 100, IPSE, may follow the pulses generated to apparatus 100 until VPD discharges to the quantity VPSE less the forward voltage of the diodes of diode portions 404. As shown, the current applied out to apparatus 100 might not be performed after the fall of VPSE and until VPSE and VPD are equal to within VDB (the forward voltage of diode portions 404) again.

MPS detection on apparatus 100 might detect the first pulse, as the current applied out to apparatus 100 from PD 106 may match the amplitude or duration requirements. However, the next two pulses may be missed, as no current might be applied out to apparatus 100 from PD 106. Two such time periods, given by tMPDO, may elapse without receipt of such current pulses at apparatus 100. Thus, in these time frames, the MPS may be considered to be absent.

Once VPSE and VPD are equal to within VDB, the diodes comprising of the diode bridge 414 will become forward biased again, and the MPS pulses provided by PD controller 406 may again cause current pulses to be issued from PD 106 to apparatus 100. Such current pulses may be received at apparatus 100 and detected, and the MPS may be considered to be present.

Thus, as shown it is possible for MPS signals to be missed while PD 106 is still connected to apparatus 100, and after some MPS signals are missed at apparatus 100, the MPS signals may yet return.

FIG. 6 is an illustration of example values from an experiment for a given cable 104, PD 106, and apparatus 100 about the relationship between VPSE drops and how many MPS signals might be missed before MPS signals resume from PD 106 and apparatus 100, according to examples of the present disclosure. Such analysis might be performed for other instances of cable 104, PD 106, and apparatus 100, and the values shown in FIG. 6 are provided for demonstration purposes.

Each row shows a different possible voltage drop from an original value of VPSE being 56 V. The permutations of FIG. 6 illustrate behavior for additional rows of voltage drops of increasing magnitude, wherein each row increases the voltage drop by 0.2 V. The second and third columns illustrate the VPSE value and the associated VPSE voltage drop. The next five columns illustrate a duration of the next five MPS pulses that are received by apparatus 100. The next five columns illustrate whether such respective pulses would be missed by apparatus 100. The next column is a repeat of the third column, for reference. The final column tallies the missed pulses.

As shown in row 1, when VPSE is 56 V, and does not drop, no pulses might be missed. Each pulse may be received at apparatus 100 with a duration of 18.7 ms, and thus may be detected and not missed. No pulses might be missed in row 1.

Similarly, in row 2, when VPSE was 56 V and drops 0.2 V, no pulses might be missed. Even though the first pulse may be of a shortened duration, it may be sufficiently long so as to be detected.

However, in row 3, when VPSE was 56 V and drops 0.4 V, a pulse might be missed. The duration of the first pulse may be shortened to 6.75 ms, which might be too short for detection.

In row 13, when VPSE was 56 V and drops 2.4 V, a second pulse might be missed. The second pulse may be shortened to 5.32 ms, which might be too short for detection.

In row 23, when VPSE was 56 V and drops 4.4 V, a third pulse might be missed. The second pulse may be shortened to 3.47 ms, which might be too short for detection. In contrast, in row 22 immediately above row 23, when VPSE dropped by 4.2 V, the third pulse may have been 8.95 ms, which may have been long enough for detection.

Accordingly, from such an example, set, control circuit 108 may be configured or programmed to determine how many MPS signals may be missed before disconnecting PD 106, and such a quantity of MPS signals may be based upon the voltage drop observed for VPSE.

Figure 7:
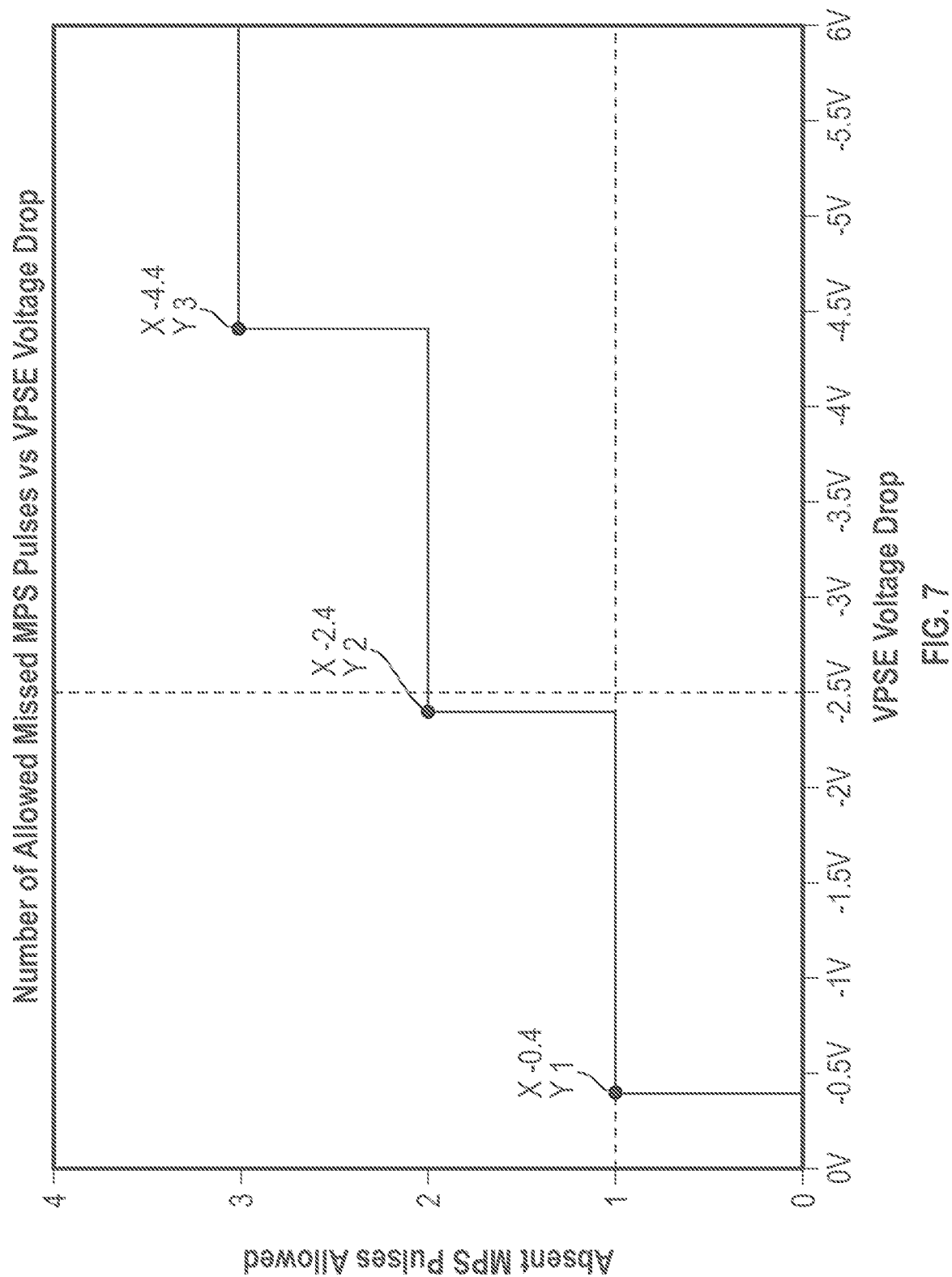
FIG. 7 is an illustration of how many allowed missed MPS pulses may be allowed versus a VPSE voltage drop before determining that a PD should no longer be powered, according to examples of the present disclosure.

FIG. 7 is an illustration of how many allowed missed MPS pulses may be allowed versus a VPSE voltage drop before determining that a PD should no longer be powered, according to examples of the present disclosure. This is based upon the example set of FIG. 6.

As shown, for a voltage drop between 0 and 0.4 V, no missed MPS signals should be experienced. Thus, a missed MPS signal in an associated voltage drop should be handled in a normal way—that is, it should indicate to apparatus 100 that PD 106 has disconnected, and power should be removed from PD 106.

For a voltage drop between 0.4 V and 2.4 V, a single missed MPS signal can be experienced while PD 106 is still connected. Thus, a single missed MPS signal with an associated voltage drop between 0.4 V and 2.4 V should not result in a determination that PD 106 has disconnected, and only after two missed MPS signals are detected should it be interpreted at apparatus 100 that PD 106 has disconnected, and power should be removed from PD 106.

For a voltage drop between 2.4 V and 4.4 V, two missed MPS signals can be experienced while PD 106 is still connected. Thus, one or two missed MPS signals in an associated voltage drop between 2.4 V and 4.4 V should not result in a determination that PD 106 has disconnected, and only after three missed MPS signals are detected should it be interpreted at apparatus 100 that PD 106 has disconnected, and power should be removed from PD 106.

For a voltage drop above 4.4 V, three missed MPS signals can be experienced while PD 106 is still connected. Thus, one, two, or three missed MPS signals with an associated voltage drop above 4.4 V should not result in a determination that PD 106 has disconnected, and only after four missed MPS signals are detected should it be interpreted at apparatus 100 that PD 106 has disconnected, and power should be removed from PD 106.

Figure 8:
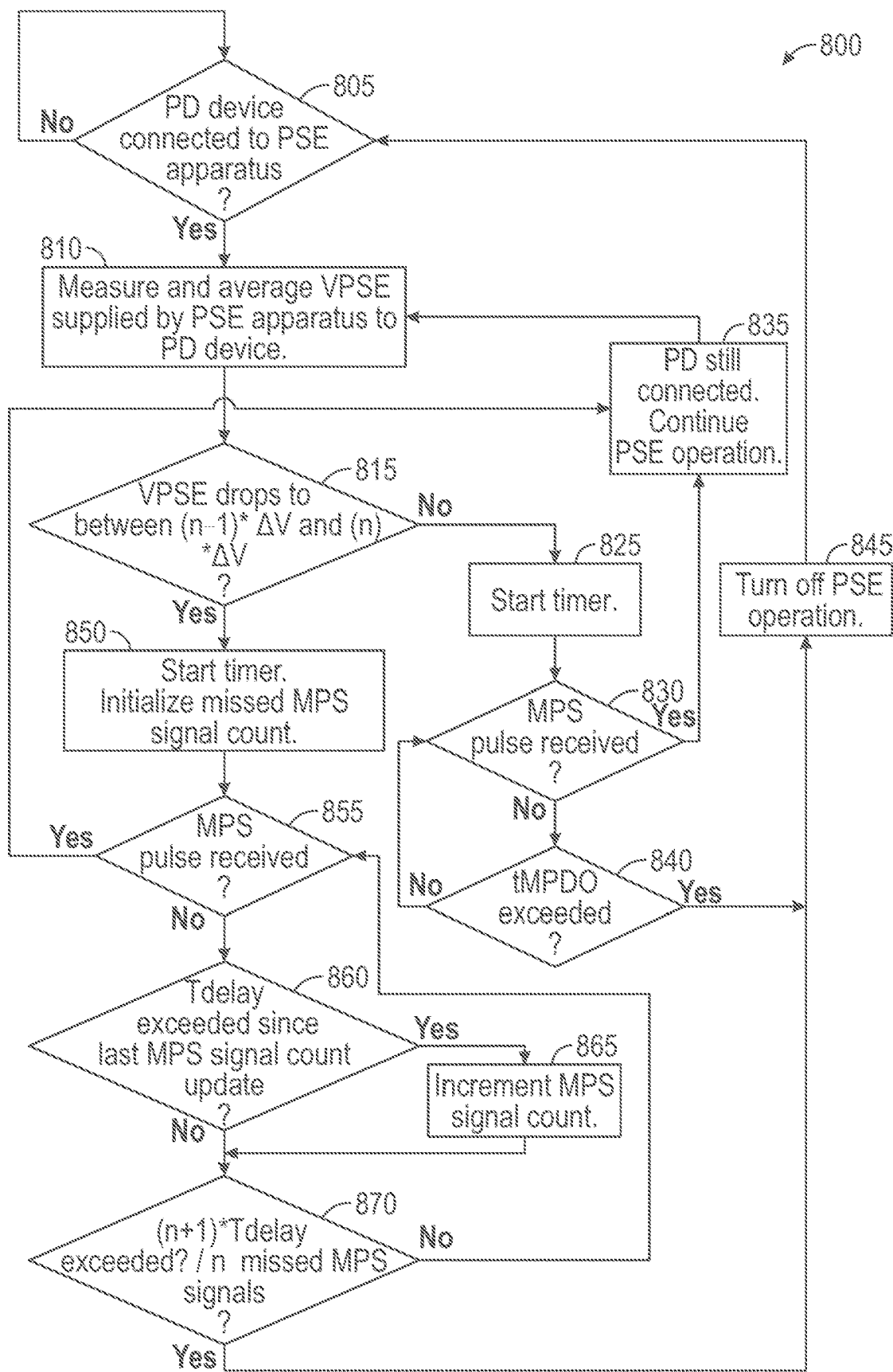
FIG. 8 is an illustration of an example method for POE MPS support for PSE voltage transients, according to examples of the present disclosure.

FIG. 8 is an illustration of an example method 800 for POE MPS support for PSE voltage transients, according to examples of the present disclosure. Method 800 may be performed by any suitable mechanism or element, such as by apparatus 100 or control circuit 108 therein. Method 800 may begin at any suitable step, such as 805. The steps of method 800 may be repeated, omitted, performed in parallel, performed recursively, or in any suitable order with respect to one another.

At 805, it may be determined whether a PD device, such as PD 106, is connected to a PSE apparatus, such as apparatus 100. If so, method 800 may proceed to 810. Otherwise, method 800 may return to 805.

At 810, a VPSE such as VPSE supplied by the PSE apparatus to the PD device may be measured and apparatus.

At 815, it may be determined whether the VPSE has dropped by at least a given amount. The amount may be, for example, a range between $((n-1)*\Delta V+\text{offset})$ and $((n)*\Delta V+\text{offset})$. The possible range of VPSE may be divided into m sections each of a width of $\Delta V$. The denotation of the section by n is a section in which one or more MPS signals might be missed without disconnecting or powering down a PD device. For example, in the scheme identified in FIG. 7, $\Delta V$ may be 2 V and offset may be 0.4 V. A drop between 0.4 V and 2.4 V may correspond to n=2. A drop between 2.4 V and 4.4 V may correspond to n=3. A drop above 4.4 V may correspond to n=3. An out-of-range measurement above the set range may default to the n=3 case. For a given voltage drop, a lookup table or other similar data structure or mechanism may be used to determine an allowed number of missed MPS signals for the given voltage drop.

If so, method 800 may proceed to 850. Otherwise, method 800 may proceed to 820.

At 820, a typical MPS detection scheme may be employed. A timer may be started. At 830, it may be determined whether an MPS pulse or signal has been received. If so, method 800 may proceed to 830. Otherwise, method 800 may proceed to 840. At 840, it may be determined whether a designated time period for an expected MPS pulse or signal has been reached, given as tMPDO. If so, method 800 may proceed to 845. Otherwise, method 800 may return to 830.

At 835, it may be determined that the PD device is still connected. PSE operation and powering of the PD device may continue. Method 800 may return to 810.

At 845, it may be determined that the PD device is not connected. PSE operation and powering of the PD device may be turned off. Method 800 may return to 805.

At 850, a modified MPS detection scheme may be employed wherein one or more MPS signals may be missed without determining that the PD is disconnected. A timer may be set. A counter to count missed MPS signals may be initialized.

At 855, it may be determined whether an MPS signal or pulse has been received. If so, method 800 may proceed to 835. Otherwise, method 800 may proceed to 860.

At 860, it may be determined whether a period of time for the expected MPS signal has been exceeded since an initialization or last update of missed MPS signal count. This period of time may be tMPDO, or may be tMPDO plus the expected duration of time of an MPS signal. This period of time may be given as Tdelay. If so, method 800 may proceed to 865. Otherwise, method 800 may proceed to 870.

At 865, the count of missed MPS signals may be incremented.

At 870, it may be determined whether the number of missed signals is at n or more, or whether the total amount of time for n missed signals (given by (n+1)*Tdelay)) has been exceeded. If so, method 800 may proceed to 845. Otherwise, method 800 may return to 855.

Method 800 may be amended so that specific values or ranges of voltage drops, associated with specific allowable missed MPS signals, may be determined. For example, specific checks of ranges may be made instead of the general form described in 815. The ranges might not be linearly spaced, and so specific range checks, associated with specific counts of MPS signals that might be safely missed, may be used instead.

Figure 9:
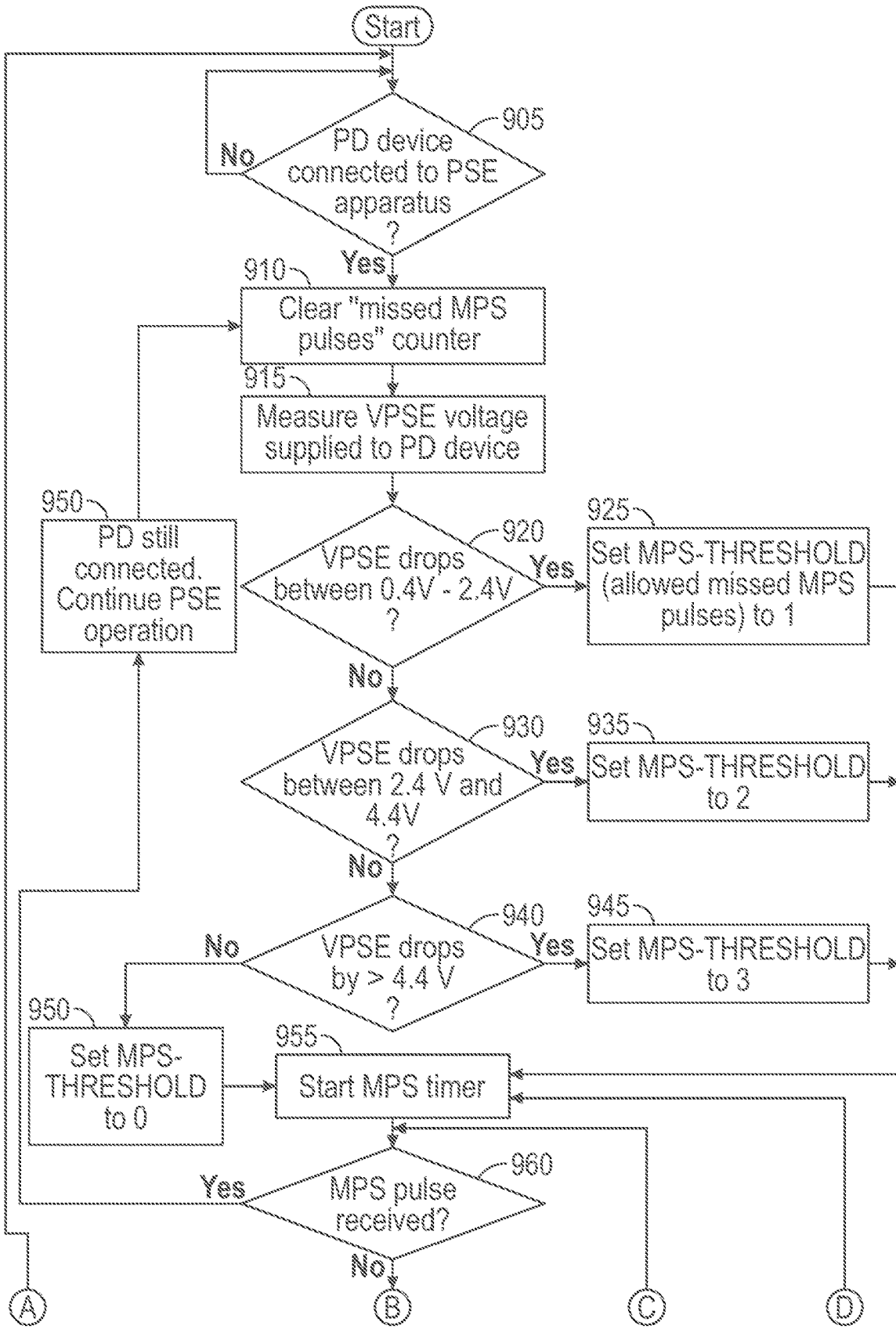
FIG. 9 is an illustration of another example method for POE MPS support for PSE voltage transients, according to examples of the present disclosure.
Figure 9:
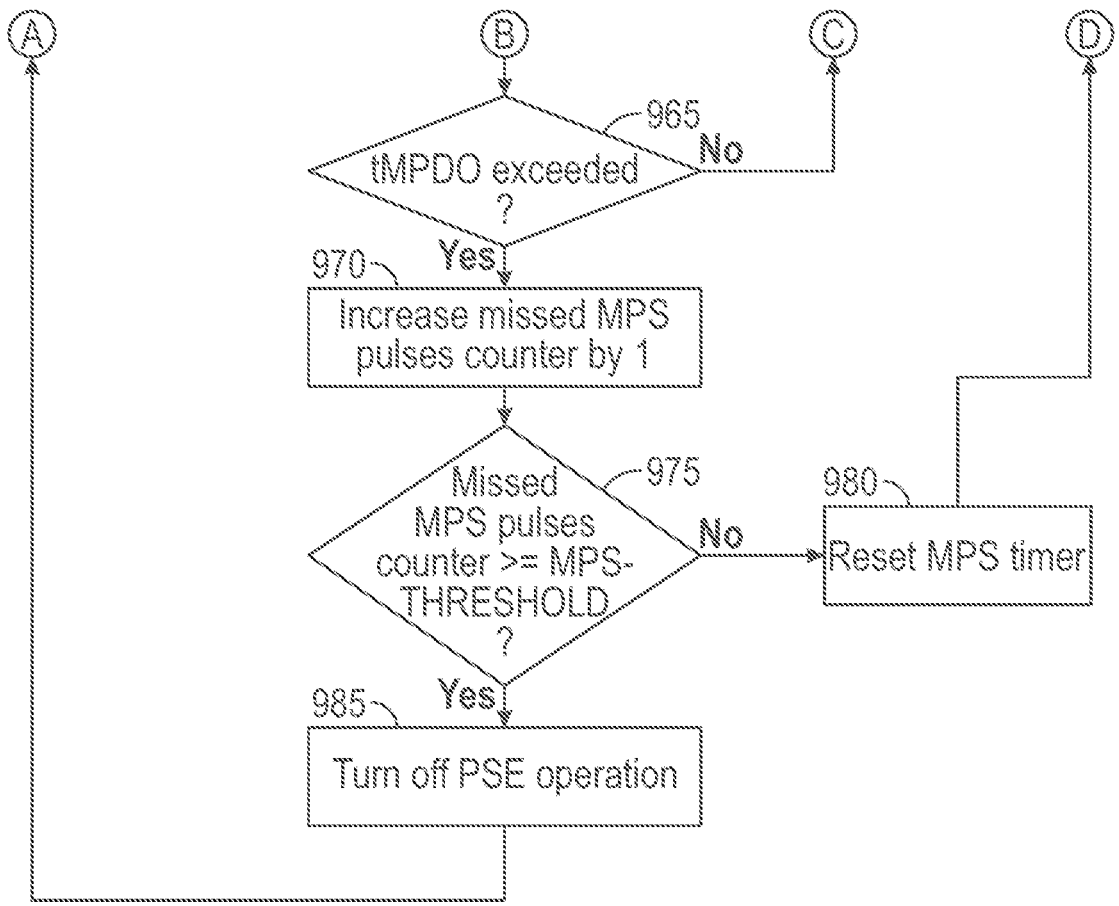

FIG. 9 is an illustration of another example method 900 for POE MPS support for PSE voltage transients, according to examples of the present disclosure. Method 900 may be a more specific example of method 800. The example of method 900 may utilize the example data from FIG. 6.

Method 900 may be performed by any suitable mechanism or element, such as by apparatus 100 or control circuit 108 therein. Method 900 may begin at any suitable step, such as 805. The steps of method 900 may be repeated, omitted, performed in parallel, performed recursively, or in any suitable order with respect to one another.

At 905, it may be determined whether a PD device, such as PD 106, is connected to a PSE apparatus, such as apparatus 100. If so, method 900 may proceed to 910. Otherwise, method 900 may return to 905.

At 910, a counter for missed MPS pulses or signals may be cleared or initialized.

At 915, a VPSE such as VPSE supplied by the PSE apparatus to the PD device may be measured. The measurement may be averaged. The measurement may be compared with previous measurements to determine whether VPSE has dropped by a given amount.

At 920, it may be determined whether the voltage drop is within a first range. For example, it may be determined whether the voltage drop is between 0.4 V and 2.4 V. If so, method 900 may proceed to 925. Otherwise, method 900 may proceed to 930.

At 925, a threshold for missed MPS signals or pulses, such as MPS-THRESHOLD, may be set to one. This may enable a modified MPS detection scheme to be employed wherein one or more MPS signals may be missed without determining that the PD is disconnected. The number of allowable missed MPS signals may be based upon the voltage drop and may be determined by, for example, looking up the value in a lookup table. Method 900 may proceed to 955.

At 930, it may be determined whether the voltage drop is within a second range. For example, it may be determined whether the voltage drop is between 2.4 V and 4.4 V. If so, method 900 may proceed to 935. Otherwise, method 900 may proceed to 940.

At 935, a threshold for missed MPS signals or pulses, such as MPS-THRESHOLD, may be set to two. This may enable a modified MPS detection scheme to be employed wherein one or more MPS signals may be missed without determining that the PD is disconnected. The number of allowable missed MPS signals may be based upon the voltage drop and may be determined by, for example, looking up the value in a lookup table. Method 900 may proceed to 955.

At 940, it may be determined whether the voltage drop is within a third range. For example, it may be determined whether the voltage drop is greater than 4.4 V. If so, method 900 may proceed to 945. Otherwise, method 900 may proceed to 950 if there are no other ranges to consider.

At 945, a threshold for missed MPS signals or pulses, such as MPS-THRESHOLD, may be set to three. This may enable a modified MPS detection scheme to be employed wherein one or more MPS signals may be missed without determining that the PD is disconnected. The number of allowable missed MPS signals may be based upon the voltage drop and may be determined by, for example, looking up the value in a lookup table. Method 900 may proceed to 955.

At 950, a typical MPS detection scheme may be employed by setting MPS-THRESHOLD to zero. Method 900 may proceed to 955.

At 955, a timer may be started. The timer may be set to a maximum time to wait for an MPS pulse or signal.

At 960, it may be determined whether an MPS pulse or signal has been received. If so, method 900 may proceed to 990. Otherwise, method 900 may proceed to 965.

At 965, it may be determined whether a designated time period for an expected MPS pulse or signal has been reached, given as tMPDO, or where there has been one missed MPS signal. If so, method 900 may proceed to 970. Otherwise, method 900 may return to 960.

At 970, the missed MPS pulse counter may be incremented by one.

At 975, it may be determined whether a certain quantity of MPS signals been missed (or time elapsed since an MPS signal was received, such a time equivalent to the certain quantity of MPS signals). The quantity of MPS signals may be given by MPS-THRESHOLD and may have been defined in 925, 935, 945, or 950. Thus it may be determined whether the counter of missed MPS pulses or signals (or the equivalent time thereof) is greater than or equal to MPS-THRESHOLD (or the equivalent time thereof). If so, method 900 may proceed to 985. Otherwise, method 900 may proceed to 980.

At 980, the MPS timer for timing the duration between MPS signals may be reset. Method 800 may return to 955.

At 985, it may be determined that the PD device is not connected. PSE operation and powering of the PD device may be turned off. Method 900 may return to 905.

At 990, it may be determined that the PD device is still connected. PSE operation and powering of the PD device may continue. Method 900 may return to 910.

Examples of the present disclosure may include an apparatus. The apparatus may include a POE interface to be connected to a PD over an Ethernet cable. The apparatus may include a control circuit. The control circuit may be communicatively coupled to the POE. The control circuit may be configured to measure a voltage provided by the apparatus through the Ethernet cable. The voltage may be averaged. The voltage may be measured in subsequent measurements. The control circuit may be configured to determine that the voltage has dropped by at least a given voltage change. The control circuit may be configured to, based on a determination that the voltage has dropped by at least the given voltage change, determine whether or not a predetermined quantity of MPS signals have been missed within a given time frame. The predetermined quantity of MPS signals may be greater than zero. The control circuit may be configured to, based on a determination that the predetermined quantity of MPS signals has not been missed within the given time frame, determine that the PD is still connected to the apparatus.

In combination with any of the above embodiments, the predetermined quantity of MPS signals may be based upon on an amount of the voltage drop.

In combination with any of the above embodiments, the predetermined quantity of MPS signals may be a first MPS quantity when the given voltage change is a first voltage change, and the predetermined quantity of MPS signals may be a second MPS quantity when the given voltage change is a second voltage change, wherein the first MPS quantity is less than the second MPS quantity and the first voltage change is less than the second voltage change.

In combination with any of the above embodiments, the predetermined quantity of MPS signals may be a third MPS quantity when the given voltage change is a third voltage change, wherein the third MPS quantity is greater than the second MPS quantity and the third voltage change is greater than the second voltage change.

In combination with any of the above embodiments, the control circuit may be configured to, based on a determination that the predetermined quantity of MPS signals have not been missed within the given time frame, determine that the PD is still connected to the apparatus, wherein at least one MPS signal was missed within the given time frame.

In combination with any of the above embodiments, the control circuit may be configured to, based on the determination that the predetermined quantity of MPS signals has not been missed within the given time frame, determine that the given voltage change was a transient voltage drop of the apparatus.

In combination with any of the above embodiments, the control circuit may be configured to, based on a determination that at least one MPS signal was missed within the given time frame and that the predetermined quantity of MPS signals has not been missed within the given time frame, determine that the MPS signals were prevented from reaching the apparatus by reverse-biased diodes in the PD.

In combination with any of the above embodiments, the given time frame may be a first time duration when the given voltage change is a first voltage change, the given time frame may be a second time duration when the given voltage change is a second voltage change, and the first time duration may be less than the second time duration and the first voltage change is less than the second voltage change.

In combination with any of the above embodiments, the control circuit may be configured to, based on a determination that the predetermined quantity of MPS signals was missed within the given time frame, determine that the PD is has disconnected from the apparatus.

In combination with any of the above embodiments, the control circuit may be configured to count missed MPS signals with a counter, incrementing the count upon a elapsed time for each MPS signal.

In combination with any of the above embodiments, the control circuit may be too configured to count missed MPS signals according to a total time without an MPS signal.

In combination with any of the above embodiments, the control circuit may be configured to, based on a determination that the predetermined quantity of consecutive MPS signals has not been missed, determine that the PD is still connected to the apparatus.

Examples of the present disclosure may include an apparatus with any of the elements of any of the above embodiments. The apparatus may include a counter configured to count missing MPS signals. The apparatus may include a control circuit configured to determine that a voltage provided by the apparatus to a PD has dropped by at least a given voltage change. The control circuit may be configured to, based upon a determination that the voltage provided to the PD has dropped by at least a given voltage change, set the counter to begin counting missing MPS signals. The control circuit may be configured to determine whether an additional MPS signal has been received. The control circuit may be configured to, based upon a determination that an additional MPS signal has been received, determine that the PD is still connected to the apparatus. The control circuit may be configured to, based upon a determination that an additional MPS signal has not been received, determine whether the counter has reached a predetermined quantity of missing MPS signals. The control circuit may be configured to, based upon a determination that the counter has a reached the predetermined quantity of missing MPS signals, determine that the PD is disconnected from the apparatus.

Although examples have been described above, other variations and examples may be made from this disclosure without departing from the spirit and scope of these examples.

We claim:

1. An apparatus, comprising:
   a power-over-Ethernet (POE) interface to be connected to a powered device (PD) over an Ethernet cable; and
   a control circuit communicatively coupled to the POE interface, the control circuit configured to:
   measure a voltage provided by the apparatus through the Ethernet cable;
   determine that the voltage has dropped by at least a given voltage change;
   based on a determination that the voltage has dropped by at least the given voltage change, determine whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determine that the PD is still connected to the apparatus;
wherein the predetermined quantity of MPS signals is based upon an amount of the given voltage change.

2. The apparatus of claim 1, wherein the control circuit is configured to, based on the determination that the predetermined quantity of MPS signals has not been missed within the given time frame, determine that the given voltage change was a transient voltage drop of the apparatus.

3. The apparatus of claim 1, wherein the control circuit is configured to, based on a determination that the predetermined quantity of MPS signals was missed within the given time frame, determine that the PD is disconnected from the apparatus.

4. An apparatus, comprising:
a power-over-Ethernet (POE) interface to be connected to a powered device (PD) over an Ethernet cable; and
a control circuit communicatively coupled to the POE interface, the control circuit configured to:
measure a voltage provided by the apparatus through the Ethernet cable;
determine that the voltage has dropped by at least a given voltage change;
based on a determination that the voltage has dropped by at least the given voltage change, determine whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determine that the PD is still connected to the apparatus;
wherein:
the predetermined quantity of MPS signals is a first MPS quantity when the given voltage change is a first voltage change;
the predetermined quantity of MPS signals is a second MPS quantity when the given voltage change is a second voltage change; and
the first MPS quantity is less than the second MPS quantity and the first voltage change is less than the second voltage change.

5. The apparatus of claim 4, wherein:
the predetermined quantity of MPS signals is a third MPS quantity when the given voltage change is a third voltage change; and
the third MPS quantity is greater than the second MPS quantity and the third voltage change is greater than the second voltage change.

6. An apparatus, comprising:
a power-over-Ethernet (POE) interface to be connected to a powered device (PD) over an Ethernet cable; and
a control circuit communicatively coupled to the POE interface, the control circuit configured to:
measure a voltage provided by the apparatus through the Ethernet cable;
determine that the voltage has dropped by at least a given voltage change;
based on a determination that the voltage has dropped by at least the given voltage change, determine whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determine that the PD is still connected to the apparatus;
wherein the control circuit is configured to, based on the determination that the predetermined quantity of MPS signals has not been missed within the given time frame, determine that the PD is still connected to the apparatus, wherein at least one MPS signal was missed within the given time frame.

7. An apparatus, comprising:
a power-over-Ethernet (POE) interface to be connected to a powered device (PD) over an Ethernet cable; and
a control circuit communicatively coupled to the POE interface, the control circuit configured to:
measure a voltage provided by the apparatus through the Ethernet cable;
determine that the voltage has dropped by at least a given voltage change;
based on a determination that the voltage has dropped by at least the given voltage change, determine whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determine that the PD is still connected to the apparatus;
wherein the control circuit is configured to, based on a determination that at least one MPS signal was missed within the given time frame and that the predetermined quantity of MPS signals has not been missed within the given time frame, determine that the at least one MPS signal was prevented from reaching the apparatus by reverse-biased diodes in the PD.

8. An apparatus, comprising:
a power-over-Ethernet (POE) interface to be connected to a powered device (PD) over an Ethernet cable; and
a control circuit communicatively coupled to the POE interface, the control circuit configured to:
measure a voltage provided by the apparatus through the Ethernet cable;
determine that the voltage has dropped by at least a given voltage change;
based on a determination that the voltage has dropped by at least the given voltage change, determine whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determine that the PD is still connected to the apparatus;
wherein:
the given time frame is a first time duration when the given voltage change is a first voltage change;
the given time frame is a second time duration when the given voltage change is a second voltage change; and
the first time duration is less than the second time duration and the first voltage change is less than the second voltage change.

9. A method, comprising:
connecting, through a power-over-Ethernet (POE) interface, to a powered device (PD) over an Ethernet cable;
measuring a voltage provided through the Ethernet cable;
determining that the voltage has dropped by at least a given voltage change;
based on a determination that the voltage has dropped by at least the given voltage change, determining whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determining that the PD is still connected;
wherein the predetermined quantity of MPS signals is based upon the given voltage change.

10. The method of claim 9, comprising, based on a determination that the predetermined quantity of MPS signals was missed within the given time frame, determining that the PD has disconnected.

11. A method, comprising:
connecting, through a power-over-Ethernet (POE) interface, to a powered device (PD) over an Ethernet cable;
measuring a voltage provided through the Ethernet cable;
determining that the voltage has dropped by at least a given voltage change;
based on a determination that the voltage has dropped by at least the given voltage change, determining whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determining that the PD is still connected;
wherein:
the predetermined quantity of MPS signals is a first MPS quantity when the given voltage change is a first voltage change;
the predetermined quantity of MPS signals is a second MPS quantity when the given voltage change is a second voltage change; and
the first MPS quantity is less than the second MPS quantity and the first voltage change is less than the second voltage change.

12. The method of claim 11, wherein:
the predetermined quantity of MPS signals is a third MPS quantity when the given voltage change is a third voltage change; and
the third MPS quantity is greater than the second MPS quantity and the third voltage change is greater than the second voltage change.

13. A method, comprising:
connecting, through a power-over-Ethernet (POE) interface, to a powered device (PD) over an Ethernet cable;
measuring a voltage provided through the Ethernet cable;
determining that the voltage has dropped by at least a given voltage change;
based on a determination that the voltage has dropped by at least the given voltage change, determining whether or not a predetermined quantity of Maintain Power Signature (MPS) signals have been missed within a given time frame, the predetermined quantity of MPS signals greater than zero;
based on a determination that the predetermined quantity of MPS signals has not been missed within the given time frame, determining that the PD is still connected; and
based on the determination that the predetermined quantity of MPS signals has not been missed within the given time frame, determining that the PD is still connected, wherein at least one MPS signal was missed within the given time frame.

14. A method, comprising:
connecting, through a power-over-Ethernet (POE) interface, to a powered device (PD) over an Ethernet cable;
measuring a voltage provided through the Ethernet cable;
determining that the voltage has dropped by at least a given voltage change;
based on a determination that the voltage has dropped by at least the given voltage change, determining whether or not a predetermined quantity of Maintain Power Signature (MPS) signals have been missed within a given time frame, the predetermined quantity of MPS signals greater than zero;
based on a determination that the predetermined quantity of MPS signals has not been missed within the given time frame, determining that the PD is still connected, wherein the predetermined quantity of MPS signals is based upon the given voltage change; and
based on the determination that the predetermined quantity of MPS signals has not been missed within the given time frame, determining that the given voltage change was a transient voltage drop of the apparatus.

15. A method, comprising:
connecting, through a power-over-Ethernet (POE) interface, to a powered device (PD) over an Ethernet cable;
measuring a voltage provided through the Ethernet cable;
determining that the voltage has dropped by at least a given voltage change;
based on a determination that the voltage has dropped by at least the given voltage change, determining whether or not a predetermined quantity of Maintain Power Signature (MPS) signals have been missed within a given time frame, the predetermined quantity of MPS signals greater than zero;
based on a determination that the predetermined quantity of MPS signals has not been missed within the given time frame, determining that the PD is still connected;
based on a determination that at least one MPS signal was missed within the given time frame and that the predetermined quantity of MPS signals has not been missed within the given time frame, determining that the at least one MPS signal was prevented from reaching an apparatus by reverse-biased diodes in the PD.

16. A method, comprising:
connecting, through a power-over-Ethernet (POE) interface, to a powered device (PD) over an Ethernet cable;
measuring a voltage provided through the Ethernet cable;
determining that the voltage has dropped by at least a given voltage change;
based on a determination that the voltage has dropped by at least the given voltage change, determining whether or not a predetermined quantity of Maintain Power Signature (MPS) signals have been missed within a given time frame, the predetermined quantity of MPS signals greater than zero; and
based on a determination that the predetermined quantity of MPS signals has not been missed within the given time frame, determining that the PD is still connected;

wherein:
the given time frame is a first time duration when the given voltage change is a first voltage change;
the given time frame is a second time duration when the given voltage change is a second voltage change; and
the first time duration is less than the second time duration and the first voltage change is less than the second voltage change.

17. An apparatus, comprising:
a counter to count missing Maintain Power Signature (MPS) signals; and
a control circuit configured to:
   determine that a voltage provided by the apparatus to a powered device (PD) has dropped by at least a given voltage change;
   based upon a determination that the voltage provided to the PD has dropped by at least the given voltage change, set the counter to begin counting missing MPS signals;
   determine whether an additional MPS signal has been received;
   based upon a determination that the additional MPS signal has been received, determine that the PD is still connected to the apparatus;
   based upon a determination that the additional MPS signal has not been received, determine whether the counter has reached a predetermined quantity of missing MPS signals;
   based upon a determination that the counter has a reached the predetermined quantity of missing MPS signals, determine that the PD is disconnected from the apparatus.

* * * * *